United States Patent

Kosuda et al.

[11] 4,445,875
[45] May 1, 1984

[54] UNIVERSAL JOINT

[75] Inventors: Hironori Kosuda, Tokyo; Masaaki Takada, Kasukabe; Hisashi Inoue, Tokyo, all of Japan

[73] Assignee: Matsui Universal Joint Manufacturing Company, Tokyo, Japan

[21] Appl. No.: 467,313

[22] Filed: Feb. 17, 1983

Related U.S. Application Data

[63] Continuation of Ser. No. 212,508, Dec. 3, 1980, abandoned.

[51] Int. Cl.³ .......................... F16C 1/24; F16D 3/26
[52] U.S. Cl. ........................ 464/14; 464/128; 464/903
[58] Field of Search ............ 464/11, 14, 128, 131, 464/132, 903; 210/500.1, 510

[56] References Cited

U.S. PATENT DOCUMENTS

| | | | |
|---|---|---|---|
| 2,842,267 | 7/1958 | Shire, Jr. et al. | 210/510 |
| 3,293,174 | 12/1966 | Robjohns | 210/510 X |
| 3,446,507 | 5/1969 | Ulics | 464/131 X |
| 3,470,711 | 10/1969 | Kayser | 464/14 |
| 3,635,535 | 1/1972 | Schultenkamper | 464/14 X |
| 3,780,872 | 12/1973 | Pall | 210/510 X |
| 3,832,865 | 9/1974 | Lewis | 464/14 |
| 4,047,396 | 9/1977 | McElwain et al. | 464/14 |
| 4,072,616 | 2/1978 | Röhlig | 210/510 X |
| 4,103,512 | 8/1978 | McElwain et al. | 464/14 |
| 4,225,642 | 9/1980 | Hirakawa | 210/510 X |

FOREIGN PATENT DOCUMENTS

| | | |
|---|---|---|
| 55-78820 | 6/1980 | Japan . |
| 1336993 | 11/1973 | United Kingdom . |

Primary Examiner—Stuart S. Levy
Assistant Examiner—Daniel P. Stodola
Attorney, Agent, or Firm—Silverman, Cass & Singer, Ltd.

[57] ABSTRACT

A universal joint includes a journal cross having cross arms and yokes and spline shafts. The universal joint according to the invention comprises oil controllers, each in the form of a cylindrical cup made of a porous plastic material arranged in an oil reservoir in an end of the cross arm and communicating with an oil supply aperture of the journal cross. The controllers control the supply of amounts of grease to the journal cross arm ends resulting from centrifugal force, filter foreign substances such as metal particles so as to prevent abrasion of lubricated parts, and prevent grease from falling down under influence of gravity to restrain it as much as possible when the universal joint is stopped, thereby enabling the lubrication to perform smoothly when the universal joint is restarted.

5 Claims, 1 Drawing Figure

UNIVERSAL JOINT

This application is a continuation of application Ser. No. 212,508, filed Dec. 3, 1980, now abandoned.

BACKGROUND OF THE INVENTION

2. Field of the Invention

The present invention relates to an improvement of a universal joint, and more particularly to an improvement of a lubricant retaining mechanism for a universal joint including a journal cross.

2. Description of the Prior Art

A universal joint includes in general a journal cross having at its center an aperture for injecting a grease. The grease is fed through radially extending oil supply apertures along center lines of journal cross arms into oil reservoirs at the ends thereof for lubricating bearings thereat and roller bearings in bearing caps.

Although the grease has a reasonably high viscosity at a room temperature, it is completely liquid in the universal joint in operation because the joint is at a high temperature. When the universal joint operates at high speeds, its temperature generally rises considerably to as high as 200° C. because of frictional heating, so that the grease in the universal joint is liquid devoid of any viscosity. Under such a condition, the liquid grease is forced toward the ends of the journal cross arms by centrifugal force to increase the pressure in the grease, with the result that the grease tends to leak from oil seals of the universal joint. In this manner, the decreased quantity of grease gives rise to various problems. Under these conditions, the universal joint of the prior art has mainly a following disadvantage.

When the rotation of the universal joint is stopped, the liquid grease in the journal cross arm that assumes an uppermost position falls down under the influence of gravity to leave a space that the grease previously had occupied and then the grease increases its viscosity as the temperature lowers. Accordingly, when the universal joint is moved again, the described space does not include any grease, so that the metal parts are brought into direct frictional contact with the other metal parts so as to cause abrasion or seizure of the parts.

Various solutions have been proposed to overcome the wear and defect resulting from the lack of oil. The assignee of this application has proposed a lubricant retaining device comprising a plunger in an oil supply aperture, adapted to be urged by a spring when the supplied oil pressure decreases to close the oil supply aperture, thereby preventing the lack of oil due to falling of the oil (Japanese Laid-Open Patent Application No. 78,820/80). Moreover, U.S. Pat. No. 3,470,711 issued on Oct. 7, 1969 discloses a lubrication system for a universal joint comprising an oil retaining element having a W-shaped cross-section in each journal cross arm of the joint to form one way valve at the center of the element, thereby preventing the lack of oil.

These devices of the prior art exhibit superior effects which solve the above problems to an extent. However, a simpler and more effective device is needed for the universal joint.

SUMMARY OF THE INVENTION

It is a primary object of the invention to provide a universal joint capable of controlling the amount of grease supplied to journal cross arm ends owing to centrifugal force to an optimum value, thereby preventing losses of grease.

It is another object of the invention to provide a universal joint which is able to filter foreign substances such as metal particles or the like included in the grease so as to prevent abrasion of lubricated parts by the foreign substances.

It is further object of the invention to provide a universal joint which prevents grease from falling down and to retain it as much as possible when the universal joint is stopped, thereby enabling the lubrication to perform smoothly, when the universal joint is restarted.

In order that the invention may be more clearly understood, preferred embodiments will be described, by way of example, with reference to the accompanying drawings.

DETAILED DESCRIPTION OF THE PREFERRED EMBODIMENT

Figure 1:
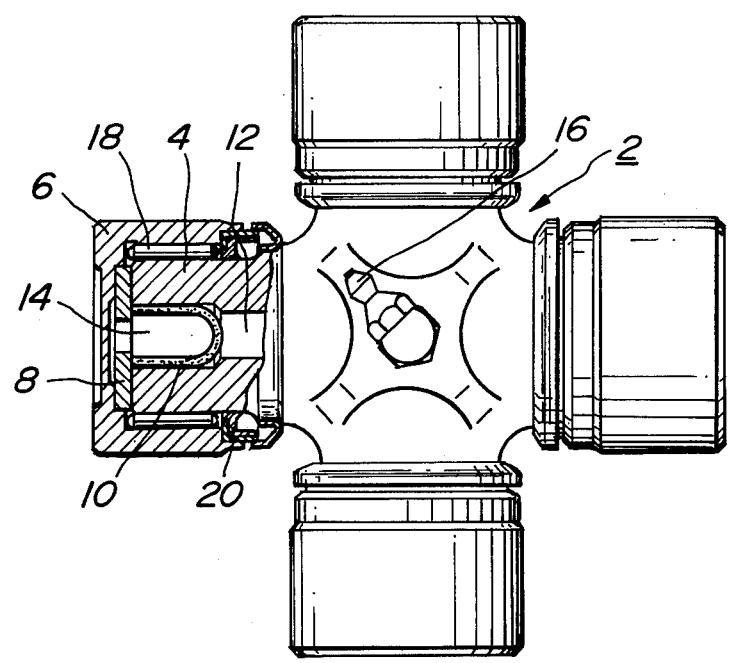
FIG. 1 is a partially sectional front elevation view of a journal cross of a universal joint embodying the invention.

FIG. 1 illustrates a journal cross 2 of a universal joint. The universal joint 3 comprises in general such a journal cross 2 having four journal cross arms 4 and yokes and spline shafts associated with the corresponding journal cross arms, which are not shown in the drawing because of their known construction. In the drawing, only one of the journal cross arms 4 is shown in section.

Between an end of each journal cross arm 4 and a bottom of a bearing cap 6 is provided a thrust washer 8 of a wear-resistant plastic material, for example, Delrin No. 100 (trade name). A grease nipple 16 is provided, through which a grease is fed through oil supply apertures 12 radially extending into oil reservoirs 14 for lubricating the thrust washers 8 and needle bearings 18 arranged laterally and inwardly thereof. A reference numeral 20 illustrates an oil seal which prevents any leakage of the oil.

According to the invention, within the oil reservoir 14 is provided an oil controller 10 in the form of a cylindrical cup having a seat made of a porous plastic material, for example, polypropylene, preferably, Delrin No. 100 (trade name). As shown in section in the drawing, the oil controller 10 snugly fitted in the oil reservoir 14 has an inner end, that is preferably hemispherical and directed to a rotating center of the journal cross.

The porous plastic material used for the oil controller has preferably pores of approximately 100 μm diameters but those materials having 30–300 μm diameter pores are also similarly effective. However, it has been experimentally found that those materials having pores less than 10 μm or more than 500 μm are not effective.

With the universal joint constructed according to the invention as above described, when a grease is injected through the grease nipple 16 so as to fill the oil supply apertures 12. The grease under pressure passes through the pores of the porous oil controllers 10 into the oil reservoirs 14 to lubricate the thrust washers 8 and needle bearings 18 as above described.

In operation, the universal joint is at high temperatures as above described so that the grease is completely liquid. Under such a condition, the porous oil controllers 10 as above mentioned bring about the following functions.

(i) The supply of the grease to the ends of the journal cross arms caused by the centrifugal action is so controlled that optimum amounts of grease are supplied to the ends, thereby reducing losses of grease.

(ii) When the universal joint is stopped, the oil controllers prevent the liquid grease from returning to the center of the journal cross, thereby ensuring complete lubrication when the universal joint is started again.

(iii) Foreign substances in the grease are removed by the filtering action of the oil controllers, thereby reducing any abrasion of the lubricated portions of the universal joint.

A further effect of the universal joint according to the invention has been experimentally ascertained. The lubricating effect of the grease placed in a journal cross of the prior art was retained for a vehicle travel of only 20,000 km. This travel distance was improved to 60,000 km by the proposal of the Japanese Laid-open Patentthe spirit and scope thereof.

What is claimed is:

1. A universal joint provided with a journal cross having a journal center and projecting journal arms, the end of each arm forming an elongate oil reservoir, and an oil supply aperture communicating each reservoir with the journal center, the joint further comprising an oil controller arranged in each oil reservoir, each controller being integrally formed and comprising an elongate cylindrical cup of one piece construction having a major portion of the length thereof snugly fitted within the corresponding reservoir, said elongate cylindrical cup including a closed hemispherical end arranged in the oil reservoir at said aperture and directed toward the center of the journal cross, said hemispherical end providing a reinforced and enlarged surface exposed to the journal center, at least said hemispherical end being formed of a porous plastic material, the pores of the porous material providing means for permitting foreign substance filtering and passage of high temperature grease from the oil supply aperture to the oil reservoir and generally precluding passage of high viscosity grease from the oil reservoir back through the oil supply aperture.

2. The joint of claim 1 wherein said plastic material has pore diameters of 30–300 μm.

3. The joint of claim 2 wherein said pore diameters are approximately 100 μm.

4. The joint of claim 2 wherein said plastic material is polypropylene.

5. The joint of claim 1 wherein a thrust washer of a wear-resistant plastic material is provided at each end of the journal cross arms of the journal cross.

* * * * *

UNITED STATES PATENT AND TRADEMARK OFFICE
CERTIFICATE OF CORRECTION

PATENT NO. : 4,445,875

DATED : May 1, 1984

INVENTOR(S) : Kosuda, et al.

It is certified that error appears in the above-identified patent and that said Letters Patent are hereby corrected as shown below:

Column 2, line 60, change "12. The" to --12, the--.

Column 3, line 20, after "Patent" insert --Application No. 78,820/80. The universal joint according to the present invention can retain the grease placed therein for the time corresponding to 100,000 km of vehicle travelling. The hemispherical end of the oil controller 10 serves to reinforce thereat and increase the filtering area for the grease.

It is further understood by those skilled in the art that the foregoing description is preferred embodiments of the disclosed joints and that various changes and modifications may be made in the invention without departing from--.

Signed and Sealed this

Twenty-seventh Day of November 1984

[SEAL]

Attest:

GERALD J. MOSSINGHOFF

Attesting Officer    Commissioner of Patents and Trademarks